Aug. 11, 1942.  C. H. BISSELL  2,292,818
FITTING FOR SERVICE ENTRANCE CABLE
Filed April 14, 1941
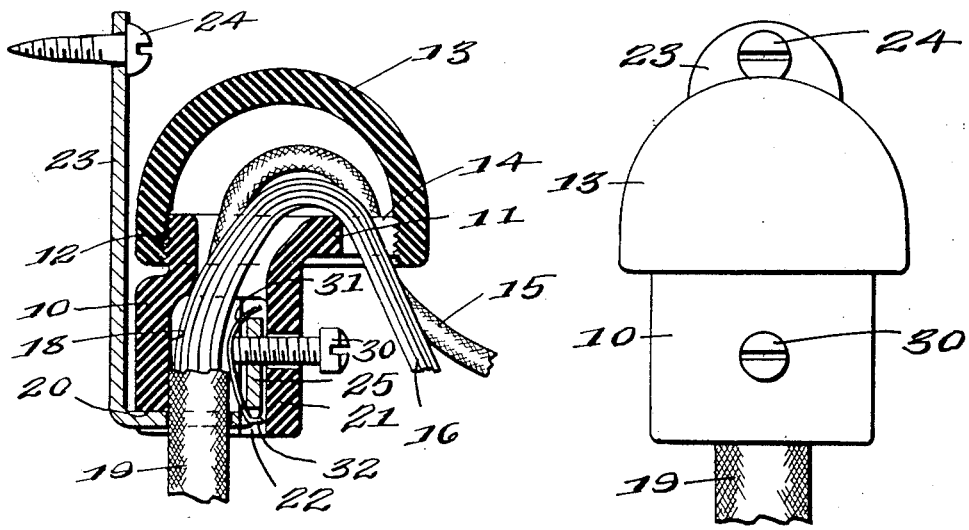
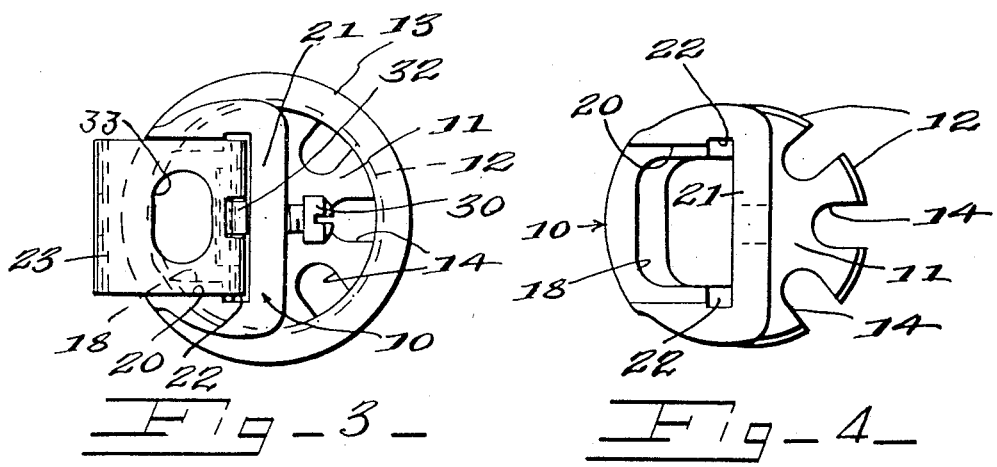
INVENTOR.
Carl H. Bissell
BY Bodell & Thompson
ATTORNEYS.

Patented Aug. 11, 1942

2,292,818

UNITED STATES PATENT OFFICE 2,292,818

FITTING FOR SERVICE ENTRANCE CABLES

Carl H. Bissell, Syracuse, N. Y., assignor to Crouse-Hinds Company, Syracuse, N. Y., a corporation of New York Application April 14, 1941, Serial No. 388,387

5 Claims. (Cl. 174—81)

This invention relates to a fitting for electrical service entrance cable.

At the present time, the so-called service entrance cable is being used extensively in the place of conductors housed in conduit for electrical service. This cable is formed with one or more insulated conductors surrounded by a flexible metallic sheath which serves as the neutral or grounded conductor. The cable extends upwardly along the side of the building and is secured thereto as by means of staples or straps. The chief object of using the service entrance cable in place of the usual conduit installation is to effect a material saving in the cost of the electrical service, and in keeping with this theory of economy the present invention has as an object a particularly simple and economical entrance cap or fitting consisting only of a body member, cap member, and supporting bracket. The body and cap are preferably formed of plastic material, such as Bakelite, and the bracket consists of a flat metal strap of substantially U shape formation, the body being detachably secured to the supporting bracket or strap, and the cable being clamped into the body by a conveniently operated single means in the nature of a screw.

The invention consists in the novel features and in the combinations and constructions hereinafter set forth and claimed.

In describing this invention, reference is had to the accompanying drawing in which like characters designate corresponding parts in all the views.

Figure 1 is a front elevational view of a fitting embodying my invention.

Figure 2 is a vertical sectional view.

Figure 3 is a bottom plan view.

Figure 4 is a bottom plan view of the body member of the fitting.

The fitting consists of a body 10 of somewhat irregular shape and being formed with an outwardly extending flange 11 adjacent the upper end thereof. The periphery of the flange is threaded, as at 12, to receive a dome-shaped cap member 13. The flange 11 is provided with two or more apertures 14 to receive the conductors 15, 16 of the cable. The cable, illustrated in connection with Figure 2, is provided with one insulated conductor 15 for the hot side of the circuit, and a flexible metallic sheath 16 which serves as the neutral or grounded side of the circuit.

The body is formed with an aperture 18 extending axially therethrough for the reception of the cable designated generally at 19, and the bottom or lower end of the body is formed with a transversely extending slot 20, and the side walls of the aperture 18, adjacent the forward wall 21, are formed with axially extending slots 22.

The body is supported by a bracket 23 formed of flat metal stock, and is of substantially U formation, the longer leg being arranged to engage the side of the building and being detachably secured thereto as by screw 24. The bracket 23 is arranged in the slot 20 extending transversely of the body, and is bent upwardly with the end portion 25 extending axially in the aperture 18, with the side edges of the end portion being positioned in the slots 22. The end portion 25 is provided with a threaded aperture to receive a clamping screw 30 which extends through the forward wall 21 of the body and thus serves to detachably secure the body to the bracket 23. The slots 20, 22 prevent rotation or lateral movement of the body on the intermediate portion of the bracket, and the screw 30 is also employed to clamp the cable 19 securely in the aperture 18 of the body. In order to prevent the inner end of the screw from damaging the cable, a plate 31 is positioned to be engaged by the screw. The lower end of the plate is formed with a relatively narrow tongue 32 positioned in a slot formed in the bight of the bracket, as indicated in Figures 2 and 3. The transversely extending portion of the bracket is formed with an aperture 33 arranged in register with aperture 18 to receive the cable 19.

It will be apparent that the fitting is of extremely simple construction, economical to manufacture, and convenient to install and serves to rigidly secure the upper end of the cable to the building.

What I claim is:

1. A fitting for service entrance cable comprising a body formed with a cable receiving aperture extending therethrough and having a flange extending outwardly from the body adjacent the upper end thereof, the outwardly extending portion of said flange being formed with apertures for receiving the conductors of the cable, a supporting bracket having a portion extending transversely across the bottom of the body and an end portion extending axially into said passage, said first mentioned portion of the bracket being formed with a cable receiving aperture arranged in register with the aperture in the body, means cooperable to detachably secure the body to the bracket and to clamp the cable in the aperture of the body, and a cap detachably secured to the upper end of the body.

2. A fitting for service entrance cable comprising a body formed with a cable receiving aperture extending therethrough, a supporting bracket having a portion extending transversely across the lower end of the body and an end portion extending axially in said aperture, said first portion being formed with a cable receiving aperture arranged in register with the aperture in the body, a single means cooperable to detachably secure the body to said bracket and to clamp the cable in the aperture of the body, and a cap detachably secured to the upper end of the body.

3. A fitting for service entrance cable comprising a body formed with a cable receiving aperture extending therethrough, a supporting bracket having a portion extending transversely across the lower end of the body and an end portion extending axially in said aperture, said first portion being formed with a cable receiving aperture arranged in register with the aperture in the body, a screw cooperable to detachably secure the body to said bracket and to clamp the cable in the aperture of the body, and a dome-shaped cap detachably secured to the upper end of the body.

4. A fitting for service entrance cable comprising a body formed with a cable receiving aperture extending therethrough, a supporting bracket having a portion extending transversely across the lower end of the body and being formed with a cable receiving aperture arranged in register with the aperture in the body, said bracket including an end portion extending axially in the aperture of the body and being provided with a threaded aperture, a screw extending through the body and threading into said end portion and being cooperable to clamp the cable in the body, said body being formed with a circular flange adjacent the upper end thereof and arranged eccentric to the body with a portion of said flange extending outwardly from the body, said outwardly extending portion being formed with apertures, and a dome-shaped cap member detachably secured to said flange.

5. A fitting for service entrance cable comprising a body formed with a cable receiving aperture extending therethrough and having a flange extending outwardly from the body adjacent the upper end thereof and being formed with apertures to receive the conductors of the cable, a slot extending transversely of the lower end of said body, a supporting bracket having an intermediate portion arranged in said slot and an end portion extending axially in the aperture of the body, said end portion being formed with a threaded aperture, a screw extending through the body and being threaded into said aperture and being cooperable to detachably secure the body to said bracket and to clamp the cable in the body, and a dome-shaped cap detachably secure to said flange.

CARL H. BISSELL.